US012741895B2

(12) United States Patent
Lemaire et al.

(10) Patent No.: US 12,741,895 B2
(45) Date of Patent: Sep. 22, 2026

(54) AERATED BIOLOGICAL FILTRATION PROCESS FOR WATER TREATMENT WITH A VIEW TO REDUCING THE NITROGEN CONTENT (NGL) OF SAID WATER WITH REDUCTION OF CARBON-SOURCE AND AERATION REQUIREMENTS

(71) Applicant: Veolia Water Solutions & Technologies Support, Saint-Maurice (FR)

(72) Inventors: Romain Lemaire, Vernou sur Brenne (FR); Jacques Montelymard, Le Perreaux sur Marne (FR); Hugues Humbert, Claye Souilly (FR); Céline Holtz, Paris (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 410 days.

(21) Appl. No.: 18/283,491

(22) PCT Filed: Mar. 25, 2022

(86) PCT No.: PCT/EP2022/058000
§ 371 (c)(1),
(2) Date: Sep. 22, 2023

(87) PCT Pub. No.: WO2022/200607
PCT Pub. Date: Sep. 29, 2022

(65) Prior Publication Data

US 2024/0101454 A1 Mar. 28, 2024

(30) Foreign Application Priority Data

Mar. 25, 2021 (FR) ...................................... 2103031

(51) Int. Cl.
*C02F 3/30* (2023.01)
*C02F 3/00* (2023.01)
(Continued)

(52) U.S. Cl.
CPC .............. *C02F 3/307* (2013.01); *C02F 3/006* (2013.01); *C02F 3/087* (2013.01); *C02F 3/104* (2013.01);
(Continued)

(58) Field of Classification Search
CPC .......... C02F 3/307; C02F 3/006; C02F 3/087; C02F 3/104; C02F 3/341; C02F 3/06;
(Continued)

(56) References Cited

U.S. PATENT DOCUMENTS 7,537,698 B2 5/2009 Sumino et al.
10,822,261 B1 11/2020 Wang et al.
(Continued)

FOREIGN PATENT DOCUMENTS

CN 109607777 A 4/2019
EP 0773908 B1 * 2/1999 .............. C02F 3/302
(Continued)

OTHER PUBLICATIONS

Machine-generated English translation of CN 109607777, generated on Dec. 29, 2025.*
(Continued)

*Primary Examiner* — Fred Prince
(74) *Attorney, Agent, or Firm* — COATS & BENNETT, PLLC

(57) ABSTRACT

The present invention relates to a biological filtration process for water loaded with nitrogenous pollutants in order to reduce the global nitrogen content of said water, characterised in that it comprises a first step of nitritation and filtration carried out in a first aerated biological reactor, a second step
(Continued)

of deammonification, denitrification and filtration carried out in a second non-aerated biological reactor, and a step of evaluation of the ratio of the nitrite content to the ammoniacal nitrogen content of the water at the outlet of the first reactor. When this ratio is greater than a predetermined stoichiometry value, the process according to the invention comprises a step of addition of water to be treated to the water originating from the first reactor so as to obtain, at the inlet of the second reactor, a mixture having a ratio of the nitrite content to the ammoniacal nitrogen content that is close to the stoichiometric ratio of the Anammox reaction.

13 Claims, 3 Drawing Sheets

(51) Int. Cl.
*C02F 3/06* (2023.01)
*C02F 3/08* (2023.01)
*C02F 3/10* (2023.01)
*C02F 3/34* (2023.01)

(52) U.S. Cl.
CPC ................ *C02F 3/341* (2013.01); *C02F 3/06* (2013.01); *C02F 2209/001* (2013.01); *C02F 2209/003* (2013.01); *C02F 2209/14* (2013.01); *C02F 2209/16* (2013.01); *C02F 2301/043* (2013.01); *Y02W 10/10* (2015.05)

(58) Field of Classification Search
CPC .......... C02F 2209/001; C02F 2209/003; C02F 2209/14; C02F 2209/16; C02F 2301/043; Y02W 10/10
USPC .......................................... 210/607, 630, 903
See application file for complete search history.

(56) References Cited

U.S. PATENT DOCUMENTS

| | | | |
|---|---|---|---|
| 2007/0251868 A1 | 11/2007 | Bailey, Jr. et al. | |
| 2014/0232893 A1 | 8/2014 | DiMassimo et al. | |
| 2018/0179092 A1* | 6/2018 | Yoshikawa | C02F 3/307 |
| 2018/0257966 A1 | 9/2018 | Rhu et al. | |

FOREIGN PATENT DOCUMENTS

| | | |
|---|---|---|
| EP | 0575314 B2 | 12/2003 |
| JP | S62262793 A | 11/1987 |
| WO | 2012136654 A1 | 10/2012 |

OTHER PUBLICATIONS

Machine-generated English translation of EP 0773908, generated on Dec. 29, 2025.*

Sui, Q. et al., Advanced nitrogen removal in a fixed-bed anaerobic ammonia oxidation reactor following an anoxic/oxic reactor. Nitrgoen removal contributions and mechanisms, Bioresource Technology, vol. 320, 2021, pp. 1-12, Elsevier.

* cited by examiner

[Fig. 1]
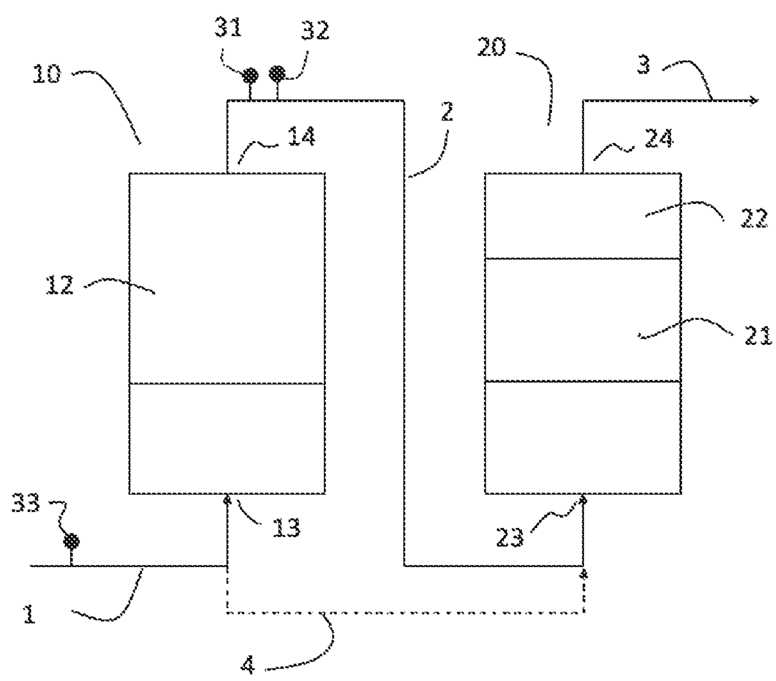

[Fig. 2]
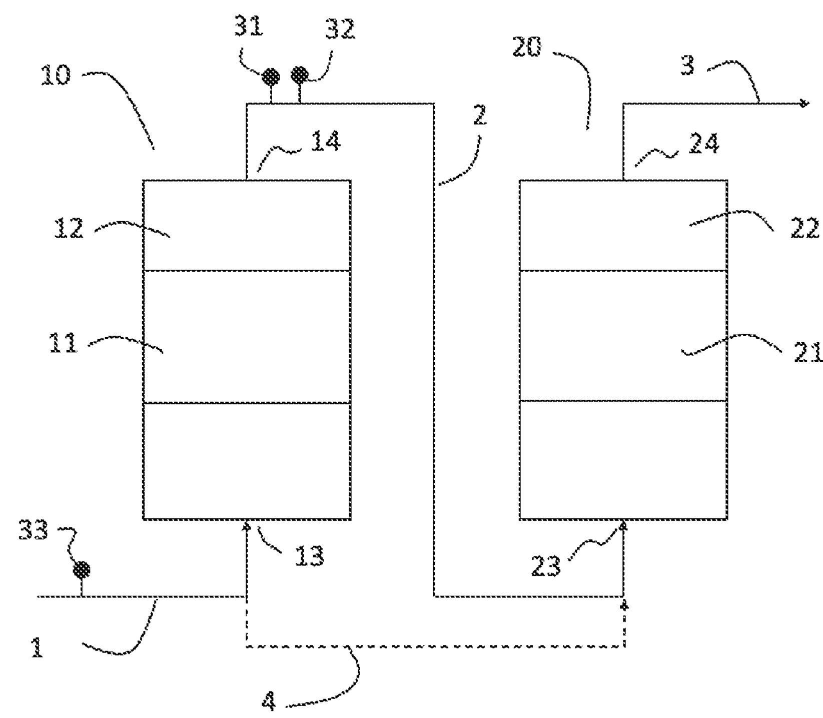

[Fig. 3]
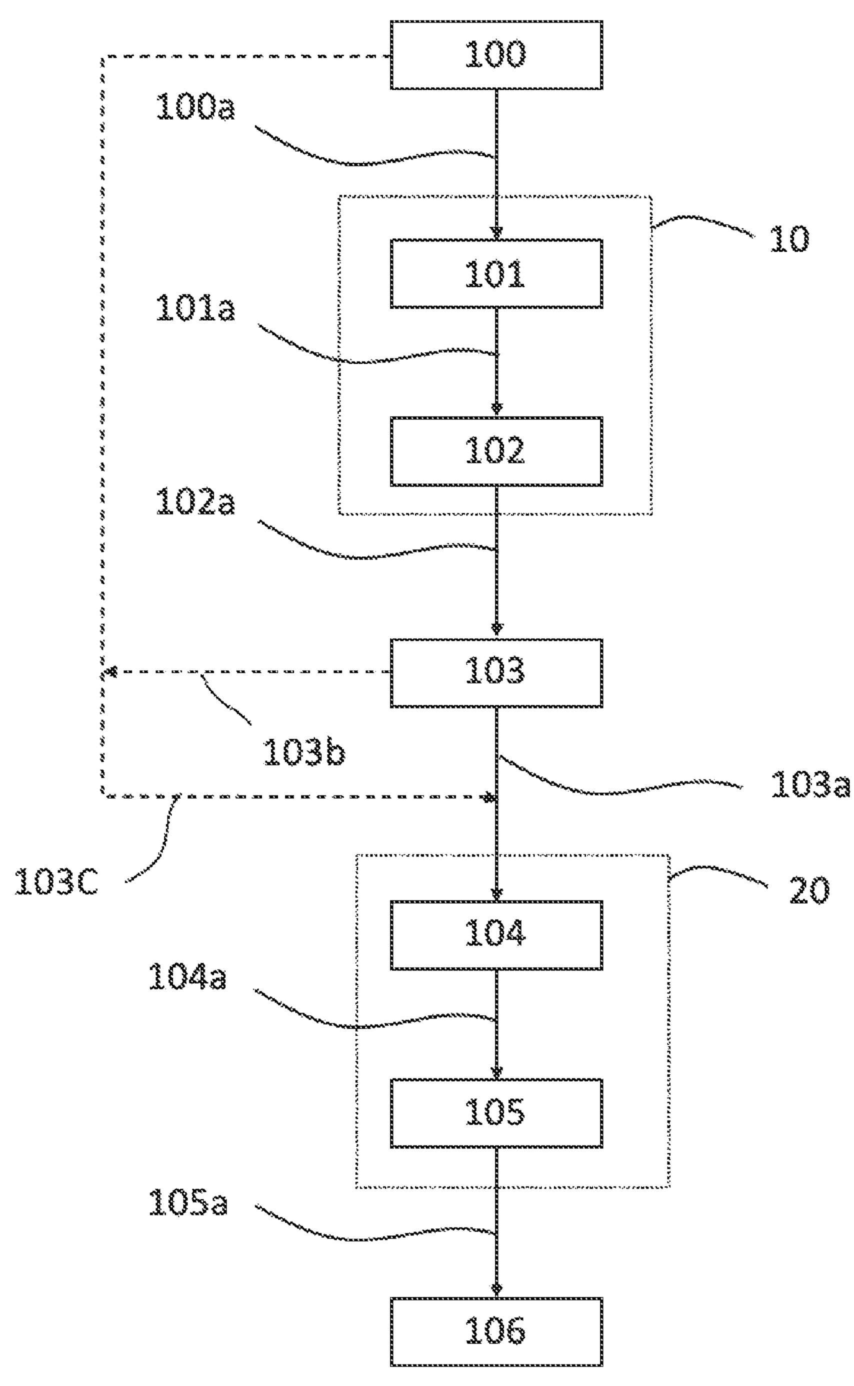

AERATED BIOLOGICAL FILTRATION PROCESS FOR WATER TREATMENT WITH A VIEW TO REDUCING THE NITROGEN CONTENT (NGL) OF SAID WATER WITH REDUCTION OF CARBON-SOURCE AND AERATION REQUIREMENTS

FIELD OF THE INVENTION

The present invention belongs to the technical field of biological treatment of water, particularly wastewater, in particular industrial and municipal wastewater. More particularly, the present invention relates to a biological filtration process for water loaded with nitrogen wherein some of the water to be treated is used for adjusting the stoichiometry of the Anammox reaction, before its entry into the reactor wherein this reaction takes place.

PRIOR ART

Biological wastewater treatment processes are currently implemented in order to reduce the nitrogen pollution content.

These processes are based on various reaction mechanisms of the nitrogen products with the bacterial populations present in the treatment reactors.

For example, the nitrification-denitrification process is based on the implementation of an aerated phase and of an anoxic phase, either within the same reactor, or each carried out in a separate reactor. The supply of oxygen during the aerated phase promotes the development of an autotrophic nitrifying bacterial biomass, consisting of AOB (ammonia oxidising bacteria) capable of converting the ammoniacal nitrogen ($NH_4^+$) into nitrites ($NO_2^-$) and of NOB (nitrite oxidising bacteria) capable of converting the nitrites into nitrates ($NO_3^-$). The anoxic phase, in the absence of aeration, promotes the development of a denitrifying biomass capable of reducing the nitrates into nitrites, then into molecular gaseous nitrogen (dinitrogen, $N_2$), thanks to the organic carbon contained in the wastewater or originating from an external organic carbon source such as methanol.

Although particularly effective, this process requires the supply of large amounts of oxygen and possibly of exogenous organic carbon sources, which makes it expensive.

The nitritation, also called "nitrate shunt", process also exists, wherein the operational conditions are modulated in such a way as to promote the development of the AOB biomass to the detriment of NOB. This process makes it possible to reduce the oxygen consumption in relation to the nitrification-denitrification process.

Finally, the nitritation-deammonification process exists that, in the absence of aeration during the deammonification, brings into play a particular population of bacteria, known as Anammox (for ANaerobic AMMonia OXidation). The Anammox bacteria are autotrophic, and capable of converting the nitrites and the ammoniacal nitrogen into gaseous nitrogen ($N_2$) and into a small amount of nitrates (approximately 11%), without it being necessary to add an organic carbon source into the reactor. Therefore, this process makes it possible to reduce the supply of organic carbon and consequently, the water treatment costs.

The document US2018257966A1 discloses wastewater treatment that comprises a biological filtration tank, a nitritation tank and an anammox tank. The biological filtration tank performs biological filtration as a pretreatment process of influent wastewater and removes solids and organic matters. The nitritation tank performs a nitritation process with regard to wastewater originating from the biological filtration tank and supplies an electron acceptor needed for removing the organic matter in the biological filtration tank by returning some of the wastewater back into the biological filtration tank. The anammox tank carries out an anaerobic ammonium oxidising process of the filtered wastewater, originating from the biological filtration tank and from the nitritation tank. However, in real conditions, the nitritation tank may not only produce nitrites and also produces nitrates. As these nitrates are not treated in the following steps, the water will also contain nitrates at the end of the treatment process.

The document WO2018/009348A1 discloses a process for treating wastewater comprising denitrification by using electron donors. The electron donors, in particular exogenous carbon sources, are added into a reactor containing a heterotrophic biomass and Anammox bacteria, dedicated to the deammonification. The amounts of electron donors supplied are modulated according to the amount of oxidised nitrogen measured at the outlet of this reactor. Thus, an adjustment time is needed between the moment of measuring the nitrogen products in the water and of detecting a deviation with the expected values, and the moment of restoring the correct deammonification conditions in the reactor after adding electron donors.

Thus, there is a need for a technique that requires no exogenous supplies of carbon, or in reduced amounts compared to existing solutions. Indeed, these exogenous supplies of carbon represent a high cost item in wastewater treatment.

There is also a need for a technique that makes it possible to anticipate decreased performance of the deammonification, in order to prevent the production of treated water from failing to meet health and/or regulatory requirements during a more or less long adjustment time.

OBJECTIVES OF THE INVENTION

One objective of the invention is to propose a process for treating water loaded with nitrogen thanks to which the consumption of oxygen and/or of carbon source is further reduced in relation to solutions known in the prior art.

Another objective is to propose a process for treating water loaded with nitrogen wherein optimisation of the deammonification conditions is carried out immediately.

Therefore, the objective of the invention is to propose a process for treating water loaded with nitrogen that is more economical and at least just as effective as the processes known from the prior art.

SUMMARY OF THE INVENTION

These objectives, as well as others that will become apparent in the following, are achieved thanks to the invention.

The invention proposes a biological filtration process for water loaded with nitrogenous pollutants in order to reduce the global nitrogen content (NGL) of said water that requires no or little exogenous supplies of carbon source. In addition, the process according to the invention makes it possible to optimise the deammonification processes independently of the oxidised or ammoniacal nitrogen values measured at the end of the process according to the invention.

The process according to the invention comprises a first step of nitritation and filtration, and a second step of deammonification, denitrification and filtration.

The first step of nitritation and filtration consists in passing water to be treated into a first aerated biological reactor having a bed of a filter medium and containing an autotrophic biomass predominantly consisting of AOB, thanks to which some of the ammoniacal nitrogen ($NH_4^+$) contained in said water to be treated is converted into nitrites ($NO_2^-$). This first step makes it possible to obtain filtered water rich in nitrites and poor in nitrates ($NO_3^-$) at the outlet of the first reactor.

The second step of deammonification, denitrification and filtration consists in passing, according to an ascending flow, the water rich in nitrites and poor in nitrates originating from the first reactor into a second non-aerated biological reactor. This non-aerated biological reactor has a first stage containing moving media receiving a bacterial biomass predominantly consisting of Anammox bacteria and heterotrophic bacteria, and a second stage containing a bed of a filter medium.

During the second step, another portion of the ammoniacal nitrogen, the nitrites originating from the first reactor and the nitrites produced by the heterotrophic bacteria are predominantly converted into molecular nitrogen and into a small amount of nitrates by the Anammox bacteria (deammonification).

In addition, during this second step, the nitrates originating from the first reactor and the small amount of nitrates produced by the Anammox bacteria are converted into nitrites by the heterotrophic bacteria (denitrification).

Moreover, during the second step, the water originating from the first stage is again filtered in the second stage.

The process according to the invention also comprises a step of evaluating the ratio of the nitrite content to the ammoniacal nitrogen content of the water on leaving said first reactor.

The process according to the invention further comprises, when the ratio of the nitrite content to the ammoniacal nitrogen content of the water on leaving said first reactor is greater than a predetermined stoichiometry value, a step of addition of water to be treated to the water originating from the first reactor so as to obtain, at the inlet of the second reactor, a mixture having a ratio of its nitrite to ammoniacal nitrogen contents that is close to the stoichiometric ratio of the Anammox reaction.

The process according to the invention is implemented with an exogenous supply of carbon source that is reduced or even zero.

By supplying the water to be treated containing the ammoniacal nitrogen in the water coming from the first reactor, it is possible to restore, at the inlet of the second reactor, a ratio between the nitrite content and the ammoniacal nitrogen content close or equal to the stoichiometric ratio of the Anammox reaction. The conditions are then optimal for the activity of deammonification of the Anammox bacteria.

By adding the water to be treated containing carbon sources into the water coming from the first reactor, it is possible, due to the presence of suspended particles and of soluble organic matter, to supply the amount of organic carbon necessary for the correct activity of the heterotrophic bacteria present in the second reactor for treating the nitrates. The suspended particles will be filtered in the second reactor and the soluble organic matter will be consumed by the heterotrophic bacteria present in the second reactor, and will no longer be present in the water treated on leaving the second reactor. Thus, ingeniously, the process according to the invention makes it possible to create conditions favourable for the heterotrophic bacterial activity without requiring an exogenous supply of carbon, or only requiring a supply of said carbon that is reduced as much as possible. The process according to the invention is therefore more economical and at least just as effective as the processes known from the prior art.

According to a particular embodiment, the predetermined stoichiometry value is between 1 and 2.5, preferably between 1.1 and 2, more preferably between 1.2 and 1.5.

Thus, the supply of ammoniacal nitrogen from the water to be treated is operated as soon as the stoichiometry value moves away from the stoichiometric ratio of the Anammox reaction due to an imbalance in favour of the nitrites. The predetermined stoichiometry value makes it possible to tolerate a variation in the ammoniacal nitrogen contents that would remain acceptable for the correct activity of the Anammox bacteria, and would not adversely affect the correct performance of deammonification in the second reactor.

According to one embodiment, the nitrite content of the water on leaving said first reactor is measured using a probe placed at the outlet of the first reactor.

According to one embodiment, the ammoniacal nitrogen content of the water on leaving said first reactor is measured using a probe placed at the outlet of the first reactor.

As these probes are placed at the outlet of the first reactor, they make it possible to rapidly evaluate the nitrogen product contents in the water intended to enter into the second reactor. The information that these probes provide will make it possible to rapidly, that is to say almost instantaneously, make the decision to add water to be treated to rebalance the nitrites content to the ammoniacal nitrogen content in the water that will enter into the second reactor.

According to one embodiment, the process according to the invention further comprises measuring the ammoniacal nitrogen content of the water to be treated, using a probe located upstream of the first reactor.

Such a probe also makes it possible to rapidly read the ammoniacal nitrogen contents in the water to be treated and makes it possible to better adjust the amount of water to be treated to be added to the water coming from the first reactor.

According to one embodiment, the autotrophic biomass of the first reactor is fixed on the filter medium.

In these conditions, the nitrification and the filtration take place at the same time thanks to the filter medium and the bacteria present on this medium.

According to another embodiment, the first reactor comprises a first stage containing moving media and a second stage containing a bed of a filter medium.

In these conditions, the nitrification mainly takes place in the first stage. Naturally, it is possible that the autotrophic biomass also develops on the filter media of the second stage and the nitrification may continue in the second stage. The filter media of the second stage make it possible to filter the water in the first reactor, regardless of whether or not the bacterial biomass is developed on their surface. This solution is advantageous because it makes it possible to also improve the effectiveness of the nitrification and may be easily implemented in existing facilities, which would comprise two reactors with two stages in series.

According to a particular embodiment, the filter medium of the first reactor and/or of the second reactor is a fixed bed of particles of particle size between 2 and 6 mm and of bulk density between 15 and 100 $kg/m^3$.

Such a particle size makes it possible to store the biomass and retain the particulate pollution. It is then possible to effectively filter the suspended particles as well as the associated particulate organic matter present in the water to be treated during its passage in the first reactor, as well as in the water contained in the second reactor when water to be treated has been added to the water coming from the first reactor. Such particles of the medium (fixed bed) have a density less than that of the water. Thus, by flotation, they spontaneously position in the upper portion of the reactors, which also makes it possible to clean them by gravity washing.

According to a preferable alternative of this embodiment, the particles of the medium (fixed bed) are made of polystyrene.

This material is advantageous because it is economical and resistant.

According to one embodiment, the moving media of the second reactor and/or, if applicable, of the first reactor, have a density between 900 and 1200 kg/$m^3$, preferably between 920 and 980 kg/$m^3$, and comprise a surface protected from the collision with the surface of other moving media.

Such media make it possible for the Anammox bacteria biomass and the heterotrophic bacteria biomass to develop despite the movements caused by the ascending flow of the water rich in nitrites and poor in nitrates. Such movements may indeed cause collisions between the media, which would detach some of the biomass located outside of the surface protected from collisions.

According to one embodiment, the water to be treated passes into a settler, before bringing this water into the first reactor.

This embodiment makes it possible to remove some of the suspended particles and of the associated particulate organic matter contained in the water to be treated, which may sediment in the bottom of the settler.

DEFINITIONS

Within the context of the invention, "Anammox reaction" means the deammonification reaction according to which the nitrites are converted by the Anammox bacteria, in the presence of ammoniacal nitrogen, into gaseous nitrogen and into a small amount of nitrates. Based on the material assessments (Strous et al. 1999), the detailed stoichiometry of this reaction may be written as follows:

$$NH_4^+ + 1.32NO_2^- + 0.066HCO_3^- + 0.13H^+ \Rightarrow 1.02N_2 + 0.26NO_3^- + 0.066CH_2O_{0.5}N_{0.15} + 2.03H_2O \quad \text{(equation 1)}$$

Thus, within the meaning of the present invention, "stoichiometric ratio of the Anammox reaction" means the mole ratio of the nitrite content to the ammoniacal nitrogen content that, in agreement with the equation 1 above, is approximately 1.3. This ratio also corresponds to the mass ratio of the nitrogen of the nitrites to the ammoniacal nitrogen (1.3 mg N—$NO_2$/1 mg N—$NH_4$).

Within the meaning of the present invention, "stoichiometry value", unless explicitly mentioned, means the mole ratio of the nitrite content to the ammoniacal nitrogen content.

The process according to the invention makes it possible to supply ammoniacal nitrogen to the water coming from the first reactor when the stoichiometry value reflects an imbalance in the stoichiometric numbers in favour of the nitrites. Thus, the "predetermined stoichiometry value" according to the invention corresponds to the largest acceptable stoichiometry value at the inlet of the second reactor. The result of the above equation 1 is that the optimal stoichiometry value is approximately 1.3. Consequently, according to one embodiment, the predetermined stoichiometry value according to the invention is equal to 1.3.

The predetermined stoichiometry value may however move away from this value in order to cover acceptable variations in the nitrite and/or ammoniacal nitrogen contents, without this significantly affecting the activity of the Anammox bacteria present in the second reactor. Thus, the predetermined stoichiometry value may be between 1 and 2.5, preferably between 1.1 and 2, more preferably between 1.2 and 1.5. In particular, the predetermined stoichiometry value may be approximately 1, approximately 1.1, approximately 1.2, approximately 1.3, approximately 1.4, approximately 1.5, approximately 1.6, approximately 1.7, approximately 1.8, approximately 1.9, approximately 2.0, approximately 2.1, approximately 2.2, approximately 2.3, approximately 2.4 or approximately 2.5.

Within the meaning of the present invention, "exogenous supply of carbon" means an addition of organic compounds, such as methanol, which do not directly originate from the water to be treated but which are generally added to it to promote the activity of the heterotrophic bacteria.

Within the meaning of the present invention, "nitrogenous pollutants" means the derivatives of the nitrogen present in wastewater.

BRIEF DESCRIPTION OF THE FIGURES

FIG. 1 shows a diagram of a facility suitable for implementing the process according to the invention.

FIG. 2 shows a diagram of another facility suitable for implementing the process according to the invention.

FIG. 3 schematically shows the process according to the invention.

DETAILED DESCRIPTION OF THE INVENTION

The inventors have highlighted that it was also possible to improve the existing processes for treating water loaded with nitrogenous pollutants, particularly making them more economical. Indeed, the inventors have shown, ingeniously, that it was possible to use water loaded with nitrogenous pollutants (water to be treated) to adjust the nitrite and ammoniacal nitrogen stoichiometry of the Anammox reaction before the entry into the reactor wherein the Anammox reaction takes place. In addition, water loaded with nitrogenous pollutants contains carbon sources that advantageously make it possible to promote the activity of the heterotrophic bacteria responsible for the denitrification while limiting the exogenous supply of carbon sources, or even by preventing any exogenous supply of carbon sources. Thus, thanks to the process according to the invention, the oxygen consumption may be reduced up to 55% and the exogenous carbon source consumption may be reduced up to 100% in relation to the processes currently implemented.

The process according to the invention is a process for biological filtration of water loaded with nitrogenous pollutants with a view to reducing the global nitrogen content (NGL for N Global) of said water.

The process of the invention will be described in more detail, by referring to the figures for illustration purposes only, the object of these references not being to limit the scope of the present invention.

First Reactor

The process according to the invention comprises a first step of nitrification 101 and filtration 102 that occurs in a first aerated biological reactor 10 having a bed of a filter medium 12. Such a reactor may comprise known means for injecting oxygen, particularly air, such as a ramp located in the lower portion of the first reactor.

The water to be treated 100 is brought 100*a* by a pipe 1 to the inlet 13 of the first reactor 10.

According to one embodiment, such as schematically shown in FIG. 1, the water passes into the first reactor 10 according to an ascending flow and passes through a filtration and nitrification area containing an autotrophic biomass predominantly consisting of AOB fixed on a bed of a filter medium 12.

In this configuration, the nitrification 101 and the filtration 102 take place at the same level in the reactor, and occur simultaneously. With reference to FIG. 3, the water to be treated 100 is led 100*a* to the inlet of the first reactor 10, wherein the steps of nitrification 101 and filtration 102 will be carried out simultaneously, and leading it 101*a* from one stage to the other in the first reactor is not necessary.

According to another embodiment, such as schematically shown in FIG. 2, the water passes into the first reactor 10 according to an ascending flow and passes through a first stage containing moving media 11, whereon is fixed an autotrophic biomass predominantly consisting of AOB capable of carrying out the nitrification 101. The water is subsequently led 101*a* into the second stage containing the filter medium bed 12 to make it possible to filter 102 the water. The autotrophic biomass may also develop on the filter medium bed in this second stage. In this case, the filtration 102 is accompanied with a nitrification activity.

Generally, the first reactor 10 may contain other autotrophic bacteria such as NOB. However, the conditions inside the first reactor, such as the pH, the aeration, the load applied and/or the temperature, are adapted in such a way as to promote the development predominantly of AOB within the autotrophic biomass, according to known techniques of the prior art. Maintaining a low level of density of the NOB type bacteria limits the conversion of nitrites into nitrates, according to the "nitrate shunt" principle. Thus, during the first step, some of the ammoniacal nitrogen contained in the water to be treated is predominantly converted into nitrites by AOB. The water obtained at the outlet 14 of the first reactor 10, at the end of the first step, is rich in nitrites and poor in nitrates.

The first reactor 10 may also contain a heterotrophic bacterial biomass contributing to the reduction of most of the dissolved organic carbon contained in the water to be treated (oxidation of the dissolved organic carbon into $CO_2$).

It should be noted that the heterotrophic and autotrophic bacteria may develop, within the first reactor, on the bed of a filter medium 12 and, if applicable, on the moving media 11.

The fixed bed of filter particles 12 makes it possible to retain the organic matter and the suspended particles present in the water during the first step of the process according to the invention.

The water rich in nitrites and poor in nitrates reaches 102*a* the outlet 14 of the first reactor 10. The ratio of the nitrite content to the ammoniacal nitrogen content of the water on leaving 14 the first reactor 10 is then evaluated 103.

Second Reactor

The water is led 103*a* by a pipe 2 towards the inlet 23 of the second non-aerated biological reactor 20. The second step of deammonification, denitrification and filtration of the process according to the invention occurs in the second reactor 20. The water at the inlet 23 of the second reactor 20 passes through the second reactor 20 according to an ascending flow. It passes through a first stage 21 containing moving media receiving a bacterial biomass consisting of Anammox bacteria and of heterotrophic bacteria. In this first stage 21, the deammonification and the denitrification occur together 104 thanks to the presence of a carbon source. Another portion of the ammoniacal nitrogen, the nitrites originating from the first reactor and the nitrites produced by the heterotrophic bacteria are predominantly converted into molecular nitrogen and into a small amount of nitrates by the Anammox bacteria (deammonification). At the same time, in the first stage 21, the nitrates originating from the first reactor and the small amount of nitrates produced by the Anammox bacteria are converted into nitrites by the heterotrophic bacteria (denitrification). These nitrites are then used by the Anammox bacteria.

The water at the outlet of the first stage 21 thus mainly contains molecular nitrogen. It then passes 104*a* into the second stage 22, containing a bed of a filter medium, and there undergoes a step of filtration 105. It should be noted that the bacterial biomasses may also develop on the filter bed of the second stage, making it possible for the deammonification and the denitrification to continue simultaneously with the filtration in the second stage.

Media

Preferably, the moving media of the first and/or of the second reactor have a density between 900 and 1200 kg/m$^3$, preferably between 920 and 980 kg/m$^3$, and comprise a surface protected from the collision with the surface of other moving media. Such moving media are for example the moving media described in the patent application published under the number WO2012/136654.

According to a preferred embodiment, the filter medium of the first and/or of the second reactor consists of a fixed bed of particles of particle size between 2 and 6 mm and of bulk density between 15 and 100 kg/m$^3$. Such particles make it possible to retain the particulate pollution. In addition, their density lower than that of water makes it possible to wash the particles under gravity. Preferably, these particles are made of polystyrene. According to one variant, these particles are made of expanded polystyrene.

Treated Water

The water that leaves 105*a* the second reactor 20 is treated water 106. This treated water is led from the outlet 24 of the second reactor 20 by a pipe 3. This treated water may be brought to a storage area, an additional treatment area or a distribution area in view of its use.

Bypass

When the ratio of the nitrite content to the ammoniacal nitrogen content of the water, evaluated 103 at the outlet 14 of the first reactor 10, is greater 103*b* than a predetermined stoichiometry value, water to be treated 100 is added 103*c* to said water originating from said first reactor 10 thanks to a so-called bypass pipe 4. This makes it possible to obtain, at the inlet 23 of the second reactor 20, a mixture having a ratio of the nitrite content to the ammoniacal nitrogen content that is close to the stoichiometric ratio of the Anammox reaction.

According to one embodiment, the bypass 4 is a pipe that connects the pipe 1 for bringing the water to be treated 100 into the first reactor 10 to the pipe 2 for bringing the water coming from the first reactor 10 into the second reactor 20.

The bypass 4 may be equipped with a valve (not shown) for controlling the entry of the water to be treated at the pipe 1, and/or with a valve (not shown) for controlling the exit of the water to be treated at the pipe 2.

Thus, in the process according to the invention, the water at the outlet 14 of the first reactor 10 may be different from the water at the inlet 23 of the second reactor 20.

The conditions in the first reactor 10 are adjusted according to known means to enable the effective conversion of the ammoniacal nitrogen mainly into nitrites by the biomass. These known means are for example the ammoniacal nitrogen aeration and applied load in the first reactor 10. The adjustment of the conditions in the first reactor 10 is necessary when the nitrite content of the water becomes too low in relation to the ammoniacal nitrogen content, particularly when the ratio of the nitrite content to the ammoniacal nitrogen content becomes significantly lower than a predetermined stoichiometry value.

As previously indicated, the predetermined stoichiometry value may be between 1 and 2.5, preferably between 1.1 and 2, more preferably between 1.2 and 1.5. In particular, the predetermined stoichiometry value may be approximately 1, approximately 1.1, approximately 1.2, approximately 1.3, approximately 1.4, approximately 1.5, approximately 1.6, approximately 1.7, approximately 1.8, approximately 1.9, approximately 2.0, approximately 2.1, approximately 2.2, approximately 2.3, approximately 2.4 or approximately 2.5.

As the water to be treated 100 contains carbon sources, its addition 103*c* to the water coming from the first reactor 10 also makes it possible to supply the carbon sources necessary for the activity of the heterotrophic bacteria of the first stage 21 of the second reactor 20. Thus, the process according to the invention is implemented with an exogenous supply of carbon source that is reduced as much as possible or even zero. As shown in the examples, the carbon consumption is significantly reduced thanks to the process of the invention, in relation to known processes. Another advantageous consequence of the process according to the invention is that the amount of sludges formed by the exogenous supply of carbon sources is also reduced. However, it may be desired to supply an exogenous carbon source, for example when the water to be treated does not contain enough of said carbon source to enable a satisfactory activity of the heterotrophic bacteria. In order to make this supply possible, the second reactor 20 may advantageously be provided with a pipe bringing a carbon source to the first stage 21. Carbon source means easily biodegradable carbon substrates, such as methanol.

The evaluation 103 of the ratio of the nitrite content to the ammoniacal nitrogen content is performed from measured values of the nitrate and nitrite contents. This evaluation may be performed thanks to a known calculation apparatus, such as for example a calculation tool implemented by a computer. Such a computer may advantageously control the opening and the closing of the valve(s) that may equip the bypass 4, when they are present.

The measurement of the nitrite content may be carried out by any known means. According to one embodiment, the measurement of the nitrite content is carried out by a probe 31. The use of a probe 31 is advantageous because it makes it possible to continuously take measurements of the nitrite content in the water. Such probes are commercially available, such as for example the "OPUS" Nitrite probe marketed by Trios.

The measurement of the ammoniacal nitrogen content may be carried out by any known means. According to one embodiment, the measurement of the ammoniacal nitrogen content is carried out by a probe 32. The use of a probe is advantageous because it makes it possible to continuously take measurements of the ammoniacal nitrogen content in the water. An example of probe suitable for measuring the ammoniacal nitrogen content according to the invention is the ammonium analyser marketed under the AMTAX brand by Hach.

According to one embodiment, the process according to the invention further comprises measuring the ammoniacal nitrogen content of the water to be treated 100. This measurement may be carried out by any known means. In a particular embodiment, this measurement is carried out using a probe 33 located upstream of the first reactor 10, for example on the pipe 1. An example of probe suitable for measuring the ammoniacal nitrogen content according to the invention is the ammonium analyser marketed under the AMTAX brand by Hach.

According to a particular embodiment, the process according to the invention also comprises measuring the nitrate content in the water at the outlet of the first reactor 10. This measurement may be performed by any known means, in particular by a probe (not shown) placed at the outlet of the first reactor, for example on the pipe 2. This measurement makes it possible to rapidly detect nitrates, and thus reduce the supply of air in the first reactor in order to limit the development of the bacterial biomass of the NOB type.

It is possible to subject the water to be treated to one or more preliminary treatments, before bringing it into the first reactor 10. In particular, in order to reduce the amount of suspended particles in the water to be treated before its entry into the first reactor, the process according to the present invention may comprise a preliminary step of passing the water to be treated into a settler.

EXAMPLES

Other features and advantages of the invention will become more apparent from the following examples, given for illustrative and non-limiting purposes.

A water treatment plant is arranged in order to implement the process according to the invention. In particular, a first aerated biological reactor followed by a second non-aerated biological reactor are installed, connected by a pipe provided with probes for measuring the nitrite and ammoniacal nitrogen content. The pipe bringing the water to be treated into the first reactor is modified in such a way as to also communicate with a bypass pipe. The bypass pipe joins the pipe connecting the two reactors together upstream of the inlet into the second reactor.

The first aerated biological reactor 10 contains an autotrophic biomass predominantly consisting of AOB fixed on a filter medium 12. It also contains a heterotrophic biomass making it possible to reduce the dissolved organic carbon. The second non-aerated biological reactor 20 has a first stage containing moving media 21 receiving a bacterial biomass consisting of Anammox bacteria and heterotrophic bacteria, and a second stage containing a bed of a filter medium 22, whereon the bacterial biomasses may also be fixed.

Water loaded with nitrogenous pollutants 100 is brought 100*a* into the first reactor 10, wherein the nitrogen aeration and loading conditions are configured in such a way as to promote the nitrification of the ammoniacal nitrogen. At the outlet 14 of the first reactor, the water is rich in nitrites and poor in nitrates. The nitrite and ammoniacal nitrogen contents of the water at the outlet of the first reactor are measured thanks to probes 31, 32. The mole ratio of the nitrite content to the ammoniacal nitrogen content is measured and, when the value of this ratio is greater than 1.7, water to be treated 100 is injected 103*c* into the bypass 4. The water to be treated is mixed with the water coming from the first reactor 10, upstream of the inlet 23 of the second reactor 20, in such a way that the mixture has a ratio of the nitrite content to the ammoniacal nitrogen content that is close to the stoichiometric ratio of the Anammox reaction.

The oxygen consumption and the carbon source consumption are measured, correlated to the amount of nitrogen treated, and compared to the values obtained by conventional processes.

REFERENCES

Strous M, Kuenen J G, Jetten M S. Key physiology of anaerobic ammonium oxidation. Appl Environ Microbiol. 1999 July; 65(7):3248-50. doi: 10.1128/AEM.65.7.3248-3250.1999. PMID: 10388731; PMCID: PMC91484.

The invention claimed is:

1. A method of biologically treating untreated water containing nitrogenous pollutants and reducing a concentration of ammoniacal nitrogen ($NH4^+$) in the water, the method comprising:

directing at least a portion of the untreated water into a first aerated biological reactor and subjecting the water to nitritation and filtration;

passing the water through the first aerated biological reactor where ammonium oxidizing bacteria (AOB) converts a portion of the ammoniacal nitrogen to nitrites;

filtering the water passing through the first aerated biological reactor with filtering material contained in the first aerated biological reactor;

wherein the water leaving the first aerated biological reactor is rich in nitrites and includes some ammoniacal nitrogen and nitrates;

after treating the water in the first aerated biological reactor, directing the water leaving the first aerated biological reactor into a second non-aerated biological reactor and subjecting the water to deammonification, denitrification and filtration in the second non-aerated biological reactor;

in the second non-aerated biological reactor, contacting the water with a media having anammox bacteria and heterotrophic bacteria supported thereon;

wherein through an anammox reaction, the anammox bacteria in the second non-aerated biological reactor, via deammonification, converts ammoniacal nitrogen and nitrites in the water to molecular nitrogen and some nitrates;

wherein the heterotrophic bacteria in the second non-aerated biological reactor via denitrification converts nitrates in the water in the second non-aerated biological reactor to nitrites;

calculating a first ratio of nitrite content to ammoniacal nitrogen content in the water leaving the first aerated biological reactor; and when said first ratio is greater than a pre-determined stoichiometric value, the method includes adjusting the ratio of the nitrite content to the ammoniacal nitrogen content in the water in the second non-aerated biological reactor by mixing a portion of the untreated water with the water leaving the first aerated biological reactor to form a water mixture such that the water mixture directed into the second non-aerated biological reactor includes a second ratio of nitrite content to ammoniacal nitrogen content that is approximately the stoichiometric ratio of the anammox reaction.

2. The method of claim 1 wherein said pre-determined stoichiometric value is between 1 and 2.5.

3. The method of claim 1 wherein said nitrite content of the water leaving the first aerated biological reactor is measured at the outlet of the first aerated biological reactor.

4. The method of claim 1 wherein said ammoniacal nitrogen content of said water leaving the first aerated biological reactor is measured at the outlet of the first aerated biological reactor.

5. The method of claim 1 wherein said AOB in the first aerated biological reactor is supported on the filtering material.

6. The method of claim 1 wherein said first aerated biological reactor includes first and second stages with the first stage including moving media having AOB thereon and the second stage containing said filtering material.

7. The method of claim 6 wherein the filtering material in the first aerated biological reactor is a fixed bed of particles of a particle size between 2 and 6 mm and a bulk density between 15 and 100 kg/$m^3$.

8. The method of claim 1 wherein mixing said another portion of the water with the water directed into the second non-aerated biological reactor makes available an additional carbon source that promotes the activity of the heterotrophic bacteria responsible for the denitrification that takes place in the second non-aerated biological reactor.

9. The method of claim 1 wherein the nitritation and the filtration takes place simultaneously in the first aerated biological reactor.

10. The method of claim 1 including mixing said another portion of water with the water directed into the second non-aerated biological reactor such that the second ratio of nitrite content to ammoniacal nitrogen content is approximately 1.3.

11. A method of biologically treating untreated water containing carbon sources and nitrogenous pollutants and reducing a concentration of ammoniacal nitrogen ($NH4^+$) in the treated water, the method comprising:

splitting the untreated water into first and second untreated water streams;

directing the first untreated water stream into a first aerated biological reactor and subjecting the first untreated water stream to nitritation and filtration;

passing the first untreated water stream through the first aerated biological reactor where ammonium oxidizing bacteria (AOB) converts a portion of the ammoniacal nitrogen to nitrites;

filtering the first untreated water stream passing through the first aerated biological reactor with filtering material contained in the first biological reactor to form a treated water stream;

wherein the treated water stream leaving the first aerated biological reactor is rich in nitrites and includes some ammoniacal nitrogen and nitrates;

mixing the treated water stream leaving the first aerated biological reactor with the second untreated water stream to form a third water stream containing the carbon sources of the second untreated water stream;

directing the third water stream into a second non-aerated biological reactor and subjecting the third water stream to deammonification, denitrification and filtration in the second non-aerated biological reactor;

in the second non-aerated biological reactor, contacting the third water stream with media having anammox bacteria and heterotrophic bacteria supported thereon;

wherein through an anammox reaction, the anammox bacteria in the second non-aerated biological reactor, via deammonification, converts ammoniacal nitrogen and nitrites in the second non-aerated biological reactor;

wherein the heterotrophic bacteria in the second non-aerated biological reactor, via denitrification, converts the nitrates in the second non-aerated biological reactor to nitrites;

selectively supplying carbon sources contained in the second untreated water stream to the heterotrophic bacteria in the second non-aerated biological reactor to enable the heterotrophic bacteria to convert the nitrates in the second non-aerated biological reactor to nitrites; and wherein selectively supplying carbon sources to the heterotrophic bacteria in the second non-aerated biological reactor includes mixing a sufficient amount of the second untreated water stream with the treated first stream of water stream leaving the first aerated biological reactor such that the ratio of nitrite content to ammoniacal nitrogen content in the third water stream is approximately the stoichiometric ratio of the anammox reaction.

12. The method of claim 11 wherein ratio of the nitrite content to the ammoniacal nitrogen content in the third stream of water directed into the second non-aerated biological reactor is approximately 1.3.

13. A method of biologically treating untreated water containing nitrogen and organic carbon, the method comprising:

splitting the untreated water into a first untreated water stream and a second untreated water stream;

directing the first untreated water stream into a first aerated biological reactor comprising filtering media and ammonium oxidizing bacteria, and subjecting the first untreated water stream to nitritation and filtration to produce a treated water stream;

directing the treated water stream toward a second non-aerated biological reactor comprising media supporting anammox bacteria and heterotrophic bacteria;

bypassing the first aerated biological reactor with the second untreated water stream;

mixing the second untreated water stream with the treated water stream to form a combined stream, wherein the second untreated water stream supplies biodegradable organic carbon to the combined stream;

adjusting a relative flow of the second untreated water stream with respect to the treated water stream such that a ratio of nitrite to ammoniacal nitrogen in the combined stream is approximately 1.3:1 on a molar basis; and introducing the combined stream into the second non-aerated biological reactor, wherein:

(i) anammox bacteria perform deammonification based on said ratio, and (ii) heterotrophic bacteria utilize the biodegradable organic carbon supplied by the second untreated water stream to convert nitrates to nitrites.

* * * * *